United States Patent [19]
Dixon

[11] Patent Number: 5,713,502
[45] Date of Patent: Feb. 3, 1998

[54] COLLAPSIBLE TRUNK SPACER APPARATUS

[76] Inventor: Ernestine Dixon, 10369 Shepperton Ct., Jonesboro, Ga. 30236

[21] Appl. No.: 729,904

[22] Filed: Oct. 15, 1996

[51] Int. Cl.[6] ............................................. B60R 7/00
[52] U.S. Cl. ................. 224/542; 224/539; 224/925; 190/103; 383/2; 220/9.1; 211/12; 312/205
[58] Field of Search ............................. 224/539, 542, 224/404, 925; 383/2, 33, 35, 104; 150/900; 190/103, 104, 105, 107, 21, 22; 220/9.1, 9.2, 9.3; 211/12; 248/95, 97, 98, 99; 296/37.1; 312/5, 6, 205; 4/585, 587

[56] References Cited

U.S. PATENT DOCUMENTS

| | | | |
|---|---|---|---|
| 463,964 | 11/1891 | Gates | 220/9.1 |
| 1,241,210 | 9/1917 | Harvey | 190/104 |
| 2,493,181 | 1/1950 | Anderson, Jr. | 220/9.1 |
| 4,684,087 | 8/1987 | Spickard | 248/97 |
| 4,718,583 | 1/1988 | Mullican | 224/404 |
| 4,813,520 | 3/1989 | Lin | 220/9.3 |
| 4,854,430 | 8/1989 | Peterson | 190/105 |
| 4,951,818 | 8/1990 | Johnson | 190/107 |
| 5,161,700 | 11/1992 | Stannis et al. | 224/925 |
| 5,163,569 | 11/1992 | Buff | 211/201 |
| 5,251,731 | 10/1993 | Cassese et al. | 190/103 |
| 5,287,971 | 2/1994 | Dorman | 211/12 |
| 5,520,316 | 5/1996 | Chen | 224/539 |

FOREIGN PATENT DOCUMENTS

| | | | |
|---|---|---|---|
| 126211 | 12/1947 | Australia | 190/103 |
| 2454724 | 5/1976 | Germany | 224/542 |

OTHER PUBLICATIONS

"Folding Trunks And The Like"—published May 18, 1943 by A.P.C.; serial number 342,563; inventor—Hamon.

*Primary Examiner*—Henry J. Recla
*Assistant Examiner*—Gregory M. Vidovich
*Attorney, Agent, or Firm*—Henderson & Sturm

[57] ABSTRACT

A collapsible trunk spacer apparatus (10) for the trunks of automobiles wherein the spacer apparatus includes a generally rectangular collapsible carrier unit (11) having generally rigid end panels (21, 22) and generally flexible side walls (23, 24) which are operatively associated with a telescoping support unit (12) for varying the length of the carrier unit (11), and moveable divider units (13) for creating individual compartments within the carrier unit (11).

9 Claims, 2 Drawing Sheets

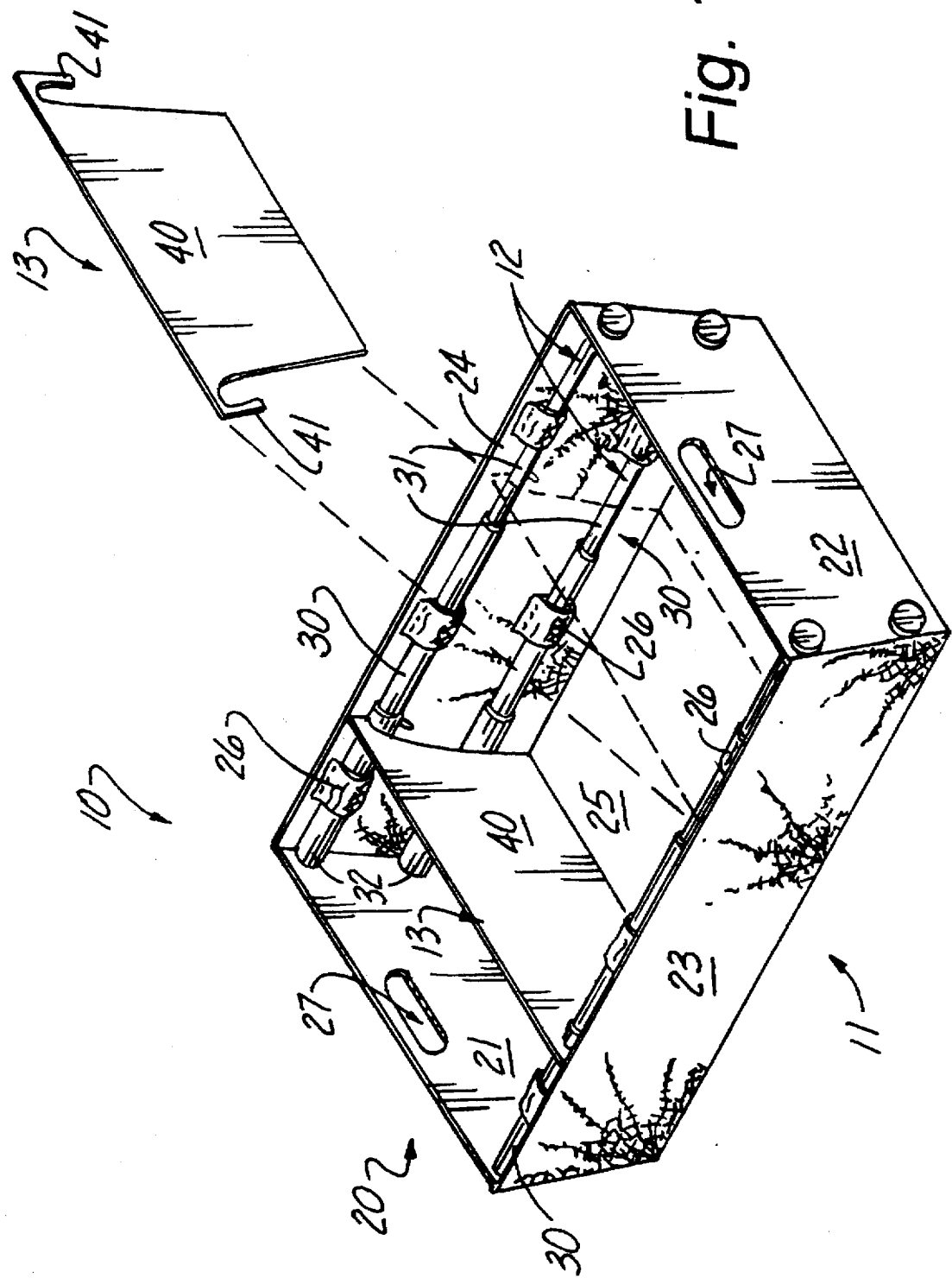

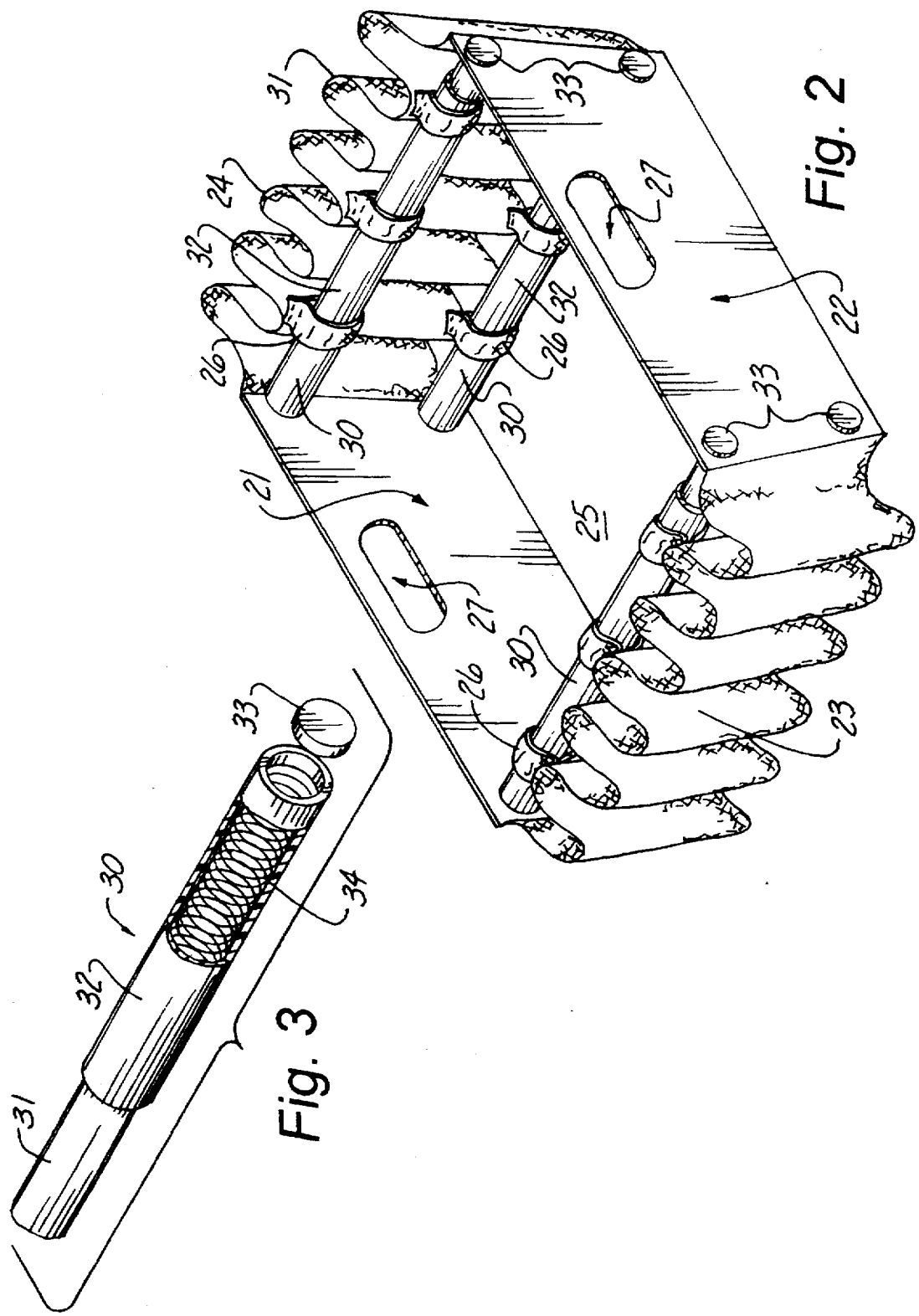

5,713,502

COLLAPSIBLE TRUNK SPACER APPARATUS

TECHNICAL FIELD

The present invention relates to the field of special receptacles in general, and in particular to a soft sided collapsible compartmental trunk spacer apparatus.

BACKGROUND ART

As can be seen by reference to the following U.S. Pat. Nos. 4,684,087; 5,163,569; 5,287,971; and 5,520,316 the prior art is replete with myriad and diverse storage arrangements for grocery bags or the like in the trunk of a vehicle.

While all of the aforementioned prior art constructions are more than adequate for the basic purpose and function for which they have been specifically designed, none of these patented arrangements are of a collapsible nature, so that the storage apparatus can conform to a less than ideal storage space. In addition, the prior art constructions as a rule involve a large number of structural components that have to be assembled for use, and which must be disassembled when the apparatus is not in use to save storage space.

Furthermore, none of the above cited patents employ any type of means wherein adjustable full length dividers are employed to define variable dimension compartments within the apparatus.

As a consequence of the foregoing situation, there has existed a longstanding need for a new type of collapsible and adjustable trunk spacer apparatus that can accommodate different dimensioned trunk spaces and which also allows the trunk spacer apparatus to have variable sized interior compartments either in the fully extended or partially collapsed mode and the provision of such a construction is a stated objective of the present invention.

DISCLOSURE OF THE INVENTION

Briefly stated, the collapsible trunk spacer apparatus that forms the basis of the present invention comprises a collapsible carrier unit mounted on a telescoping support unit and further provided with one or more moveable divider units such that the spacer apparatus may be collapsed to be custom fit for any size automobile trunk or compartment.

As will be explained in greater detail further on in the specification, the collapsible carrier unit includes both generally rigid end wall panels and generally flexible side wall and floor panels which cooperate with one another and the telescoping support unit to define a carrier having a generally fixed width and an adjustable length that can be varied to accommodate a user's particular needs.

In addition, a unique relationship exists between the end wall panels, the telescoping support unit, and the adjustable divider unit to maintain the generally constant width dimension of the trunk spacer apparatus regardless of the size of the trunk space in which the apparatus is employed.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the trunk spacer apparatus that forms the basis of the present invention deployed in its fully extended operative mode;

FIG. 2 is a perspective view of the trunk spacer apparatus deployed in the collapsed mode; and FIG. 3 is an isolated detail view of one of the telescoping support arms of the apparatus.

BEST MODE FOR CARRYING OUT THE INVENTION

As can be seen by reference to the drawings, and in particularly to FIG. 1, the collapsible trunk spacer apparatus that forms the basis of the present invention is designated generally by the reference number (10). The trunk spacer apparatus (10) comprises a generally rectangular collapsible carrier unit (11) mounted on a telescoping support unit (12) which is provided with one or more moveable divider units (13). These units will now be described in seriatim fashion.

As shown in FIGS. 1 and 2, the generally rectangular collapsible carrier unit (11) comprises a carrier member (20) having a pair of generally rigid end panels (21, 22) fabricated from plastic or the like and operatively connected to an elongated sheet of flexible material which forms a pair of collapsible side walls (23, 24) and a collapsible bottom (25) of the carrier member (20).

In addition, each of the side walls (23, 24) of the carrier member (20) are provided with a plurality of canvas loops (26) arrayed in an upper and a lower row of spaced loops (26) whose purpose and function will be explained presently. Furthermore, as can best be seen by reference to FIG. 2, each of the end panels (21, 22) are also provided with handle openings (27) to facilitate the transport of the carrier unit (11) from one location to another.

Still referring to FIGS. 1 and 2, it can be seen that the telescoping support unit (12) comprises two pairs of telescoping support members (30). Each of the telescoping support members (30) are dimensioned to be received in the upper and lower rows of spaced loops (26) formed on the opposite side walls (23, 24) of the carrier member (20).

In addition, as clearly shown in FIGS. 1 through 3, each of the telescoping support members (30) comprise an inner tubular element (31) having one end operatively connected to one of the carrier end panels (22) and the other end slidably disposed in one end of an outer tubular element (32). The other end of the outer tubular element (32) is operatively connected to the other of the carrier end panels (21).

Furthermore, each of the telescoping support members (30) are provided on opposite ends with end cap elements (33) which are operatively associated with the carrier end panels (21,22). Each of the telescoping support members (30) are also provided with a spring biasing element (34) which is disposed within the outer tubular element (32) and bears on one end against one of the end cap elements (33) while forcing the inner tubular element (31) outwardly relative to the outer tubular element (32) in a well recognized fashion.

Returning once more to FIG. 1, it can be seen that the moveable divider unit (13) comprises a contoured generally rigid panel member (40) having a pair of outwardly and downwardly depending hanger arms (41) formed on the upper end. The hanger arms (41) are dimensioned to receive and captively engage the upper telescoping support members (30) to form individual variable sized compartments within the carrier member (20).

By now it should be appreciated that in instances wherein space is not a problem, the collapsible trunk spacer apparatus (10) may be employed in the fully extended mode depicted in FIG. 1. However, in those instances wherein space is at a premium, the telescoping support unit (12) of the carrier unit (11) may be collapsed to custom fit the trunk spacer apparatus to the space available. The side walls (23, 24) and the bottom (25) of the carrier member (20) will collapse in a pleated accordion fashion as shown in FIG. 2.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A collapsible trunk spacer apparatus for the trunks of automobiles wherein the apparatus comprises:

a generally rectangular collapsible carrier unit including a carrier member having generally rigid end panels, a pair of opposing generally flexible, collapsible side walls, an open top, and a collapsible bottom, wherein said open top is defined by upper peripheral edges of said end panels and said side walls; and an extensible telescoping support unit operatively connected to said end panels and operatively associated with said collapsible side walls such that said unit extends substantially parallel to said upper edges of said side walls for deploying said collapsible carrier unit into a fully extended mode.

2. The apparatus as in claim 1 wherein said side walls are provided with a plurality of loops that are dimensioned to slidably receive said telescoping support unit.

3. The apparatus as in claim 1 further including at least one moveable divider unit operatively associated with said telescoping support unit for dividing the interior of said carrier member into different sized compartments.

4. The apparatus as in claim 1 wherein the telescoping support unit includes at least a pair of telescoping support members and each one of said pair of telescoping support members is operatively associated with one of the opposing side walls of the carrier member.

5. The apparatus as in claim 1 wherein the telescoping support unit includes two pairs of telescoping support members wherein each pair of support members are associated with one of the collapsible side walls of the carrier member.

6. The apparatus as in claim 3 wherein said at least one moveable divider unit comprises:

a generally rigid panel member having outwardly and downwardly depending hanger arms formed thereon which are dimensioned to captively engage selected portions of said telescoping support unit.

7. The apparatus as in claim 1 wherein each of said generally rigid end panels are provided with handle openings.

8. The apparatus as in claim 4 wherein each one of said pair of telescoping support members includes an inner support tube element slidably disposed within an outer support tube element and spring biased outwardly with respect thereto.

9. The apparatus as in claim 8 wherein the opposite ends of the inner and outer support tube elements are operatively connected to the end panels of the carrier member.

* * * * *